Feb. 9, 1937. O. WATSON 2,069,793
ULLAGE ROD
Filed June 26, 1936
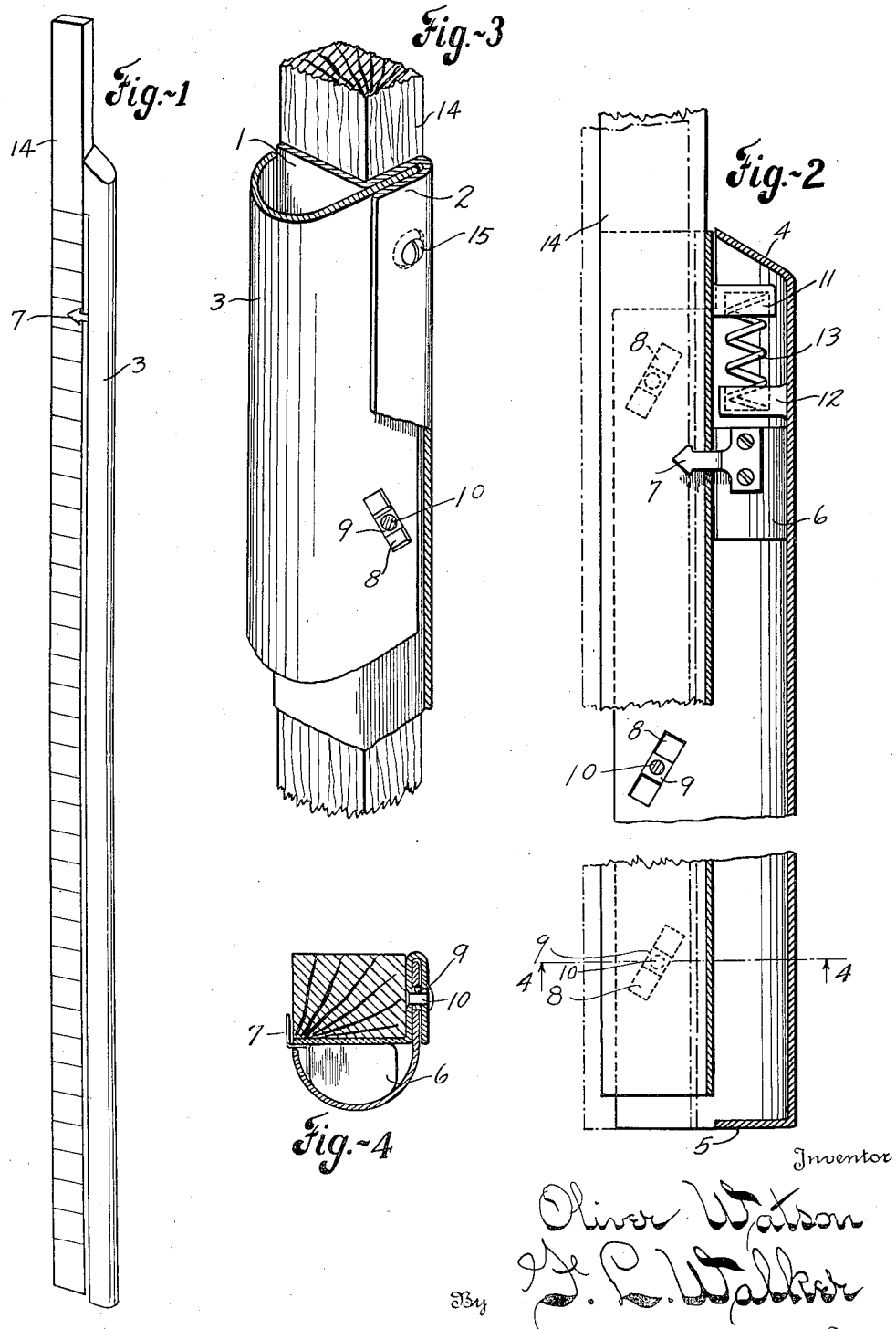
Inventor
Oliver Watson
F. L. Walker
By
Attorney Patented Feb. 9, 1937

2,069,793

UNITED STATES PATENT OFFICE 2,069,793

ULLAGE ROD

Oliver Watson, Dayton, Ohio, assignor of one-half to Bert F. Downey, Springfield, Ohio Application June 26, 1936, Serial No. 87,491

14 Claims. (Cl. 73—120)

This invention pertains to ullage rods for measuring the contents of tanks and containers and more particularly to a portable liquid gauge embodying a float operated indicator for automatically indicating a measured quantity of liquid.

The present invention is a further development of the liquid gauge device disclosed and claimed in copending application, Serial No. 756,214, filed December 6, 1934.

The gauge device includes a graduated gauge rod with which is associated a float operated indicator and means for locking the float relative to the gauge rod in the position assumed thereby at the level of the body of liquid being measured. The float is automatically released by thrust pressure of the gauge device upon the bottom of the tank or container whereupon the float and indicator rise to the liquid level, if below such level, or descend by gravity to the liquid level, if thereabove, where it is again automatically locked in such readjusted position by the release of the thrust pressure upon the device.

The device is applicable in proper size for measurement of the contents of casks, barrels, vats, sumps, or wells, but one of the fields in which it will find wide application is for measurement of the contents of underground gasoline tanks at filling stations. Whatever the purpose of the tank or the character of its contents the gauge rod must be graduated proportionately to the volumetric size of the tank or container. Some tanks being relatively wide and shallow will necessitate more closely spaced graduations while other tanks of deep but comparatively narrow proportions will require more widely spaced graduations. The tanks employed not being standard sizes it is impractical to manufacture gauges commercially with the properly spaced graduations to conform to various sizes of tanks. It is therefore necessary to either manufacture the gauges in blank or without graduations and subsequently graduate the device in accordance with the particular tank with which it is to be used or to employ as a gauge rod which has already been properly calibrated for the particular tank. Most operators of filling stations as well as others who have occasion to measure liquid contents of a tank or vat have at hand a stick which has been calibrated in accordance with the size of the tank which they thrust into the tank to ascertain the liquid level by observing the proportion of the stick which is wet upon withdrawal. Such stick method of measurement however is quite unsatisfactory because the stick becomes stained or soiled and it is difficult to note the particular line dividing the wet and dry surfaces and also because it is impossible to take a second reading before the stick has thoroughly dried. Therefore the present gauge device is designed as a complete unit which may be interchangeably attached to any one of several gauge rods or sticks. Thus the present gauge unit may be employed with the calibrated rod or stick which the operator has already at hand, the calibration of which agrees with the size of the tank with which it is to be employed.

The object of the invention is to improve the construction as well as the means and mode of operation of ullage rods and liquid gauges whereby they may not only be economically manufactured, but will be more efficient in use, accurate and automatic in operation, sensitive and capable of affording quick indication and unlikely to get out of repair.

A further object of the invention is to provide improved automatic detent and release means for the float operated indicator and to provide protective means for the float whereby it will be unlikely to be injured in inserting the device into or removing it from a tank.

A further object of the invention is to provide a gauge which will be strong and of sturdy construction having no protruding parts for engagement with the margin of the tank opening and which will be capable of withstanding hard usage.

A further object of the invention is to provide a gauge device of light weight and compact form capable of convenient operation and possessing the desirable characteristics and advantageous features of construction herein mentioned.

With the above primary and other incidental objects in view as will more fully appear in the specification, the invention consists of the features of construction, the parts and combinations thereof and the mode of operation or their equivalents as hereinafter described and set forth in the claims.

Referring to the accompanying drawing wherein is shown the preferred but, obviously, not necessarily the only embodiment of the invention, Fig. 1 is a perspective view of the assembled gauge device forming the subject matter hereof.

Fig. 2 is a vertical sectional view upon an enlarged scale.

Fig. 3 is a detail perspective view of a portion of the gauge device.

Fig. 4 is a transverse sectional view.

Like parts are indicated by similar characters of reference throughout the several views.

As before mentioned a common method of measuring the contents of a tank is to thrust a stick to the bottom of the body of liquid therein and note the portion which has been wet by contact with the liquid. However such method fails when several measurements are to be taken in quick succession, if the stick is not given time to dry between such measurements. Likewise it is frequently desirable to retain the indication for sometime after making the measurement hence the indicator of the present device is automatically locked in the position of the last indication until the next gauge reading is to be taken. The thrust pressure of the device upon the bottom of the tank releases the float and indicator for automatic readjustment into conformity with the level of the body of liquid being measured.

The unit which is assembled apart from the gauge rod comprises an angle bar or mounting member 1, one flange of which is reversely bent upon itself into parallel spaced relation as at 2 to form a longitudinal guide slot. Associated with the angle bar mounting strip 1 is a channel-shaped housing member 3 one side of which is of greater extent than the other and projects within the guide slot afforded by reversal of the angle bar flange 2. The open side of the channel housing 3 is thus closed by the angle bar mounting member 1. The channel housing 3 is also closed at its opposite ends as indicated at 4 and 5. Enclosed within the housing member is a float 6 which may be of any buoyant material but is preferably a hollow metallic float sealed against the entrance of liquid. Projecting from the float 6 is a pointer 7 which cooperates with a series of calibrations upon the gauge rod. The side wall of the housing 3 beneath the reversely turned portion 2 of the angle bar flange is provided with a plurality of inclined slots 8. Positioned within these slots 8 are spacer members 9 which are somewhat thicker than the wall of the housing member and serve to maintain the parallel portions of the reversed flange 2 of the angle bar 1 in such spaced relation as to permit free movement of the housing wall therebetween. These spacer members 9 are secured in position within the diagonal slots 8 of the housing member wall by rivets 10 extending through the parallel spaced portions of the reversed flange 2 of the angle bar 1. The spacer members 9 not only maintain the spacing of the parallel portions of the reversed flange 2 so as to permit free movement of the housing member wall therebetween but they also guide such member through a diagonal movement relative to the angle bar 1 determined by the inclination of the slots 8. In such diagonal movement of the housing 3 and bar 1 one relative to the other the float 6 is clamped therebetween by the approach of such members and is released for adjustment longitudinally within the channel-shaped housing 3 by their separation. Interiorly of the housing 3 adjacent to the upper end thereof the mount or angle bar 1 is provided with a projecting lug 11 and the housing 3 is provided with a similar lug 12 in spaced relation with the lug 11. Interposed between the respective lugs 11 and 12 is a helical spring 13 which tends to project the channel-shaped housing 3 downwardly and inwardly toward the angle bar 1 into clamping engagement with the interposed float 6. A retractive movement of the angle bar 1 and channel shaped housing 3 one relative to the other against the tension of the spring 13 causes these members to move one away from the other due to the guiding influence of the inclined slots 8 to thereby release the float 6 for readjustment longitudinally of the housing 3. The unitary structure thus far described comprising the angle bar 1 and the channel-shaped housing 3 slidingly mounted upon the angle bar for relative adjustment in a diagonal direction and the float 6 confined within the housing 3 by such angle bar and governing spring 13 controlling the movement of such members may be assembled entirely apart from the gauge rod and may be sold as a unit for attachment to any previously calibrated stick or rod or it may be attached to a gauge rod 14 which is left blank to be calibrated in accordance with the tank wherein the device is to be used. The angle of the mounting bar 1 forms a seat to receive the gauge rod 14 which may be of wood. The unit is secured to the gauge rod at spaced intervals by screws 15 which extend through the reversed flange 2 of the angle bar 1 and through the intermediate wall of the channel-shaped housing 3 which is provided with a clearance hole sufficiently large to permit unrestrained sliding adjustment of the housing 3 relative to the angle bar within the limits of the diagonal slots 8.

The unit is secured to the gauge rod in such relation that the housing 3 projects slightly beyond the lower end of the gauge rod 14. When inserted into a tank or other container for use the lower closed end 5 of the channel-shaped housing 3 rests on the bottom of the tank or container. Thrust pressure is applied to the gauge rod 14 against the resistance of the spring 13. The relatively longitudinal movement of the rod 14 causes a relative separating movement of the angle bar 1 and channel-shaped housing 3 as is indicated by dotted lines in Fig. 2. Such lateral movement of the housing incident to the relative longitudinal adjustment of the gauge rod 14 and housing 3 releases the float 6 for longitudinal movement within the housing into conformity with the level of the body of liquid being measured. The side of the gauge rod 14 having been calibrated in accordance with the tank in which the device is to be used the pointer 7 carried by the float 6 will indicate upon the graduated surface of the gauge rod the quantity of contents of the tank. Upon release of the thrust pressure upon the gauge rod the spring 13 by its reaction will return the parts 1 and 3 into clamping relation with the readjusted float 6 and so hold the float in adjusted position until the next reading is to be taken.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute, the invention has been described in language more or less specific as to structural features, it is to be understood that the invention is not limited to the specific features shown, but that the means and construction herein disclosed comprise the preferred form of several modes of putting the invention into effect, and the invention is therefore claimed in any of its forms or modifications within the legitimate and valid scope of the appended claims.

Having thus described my invention, I claim:
1. As an article of manufacture, a liquid gauge unit to be assembled apart from a gauge rod in- cluding a float, a channel shaped housing member within which the float is confined, an angle bar disposed with one exterior side at the open side of the channel shaped member and forming a closure therefor to confine the float therein, yielding interconnections between the angle bar and channel member permitting relative lateral movement thereof, resilient means urging the angle bar and channel member toward each other into clamping engagement with the confined float, and a seat comprising the interior angle of said angle bar, for a gauge rod with which the float cooperates to indicate a measured quantity of liquid.

2. As an article of manufacture, a liquid gauge unit to be assembled apart from a gauge rod including a float, an angle bar, a clamp member yieldingly connected with the angle bar and cooperating therewith to clamp the float therebetween in its assumed position at the level of a body of liquid being measured, resilient means urging the clamp member and angle bar into clamping engagement with the float, and a seat comprising the interior angle of said angle bar to receive a gauge rod with which the float may cooperate to indicate a measured quantity of liquid.

3. As an article of manufacture, a liquid gauge unit to be assembled apart from a gauge rod with which it is to be used including a float, a channel shaped member within which the float is confined, a clamp member yieldingly connected with the channel shaped member for adjustment one relative to the other, resilient means for urging the clamp member and channel member one toward the other into clamping engagement with the float to hold the float in the relative position assumed by it at the level of a body of liquid being measured, and a seat on one of said members to receive a separate gauge rod with which the float cooperates to indicate a measured quantity of liquid.

4. In a liquid gauge, a gauge rod, a reciprocatory channel shaped housing member yieldingly connected therewith for relative longitudinal movement and movable laterally relative to the rod incidental to its longitudinal adjustment, a spring against the tension of which the said members are relatively movable and a float confined within the channel shaped housing and clamped in its relative position assumed at the level of a body of liquid being measured, by the approach of the housing and rod one toward the other.

5. In a liquid gauge, a gauge rod, a channel shaped housing yieldingly connected with the rod and extending beyond the end thereof for engagement with the bottom of a container, adapted upon thrust pressure to move laterally relative to the rod, a spring against the yielding resistance of which the housing and rod are relatively movable, and a float confined within the channel shaped housing and clamped in its position assumed at the level of a body of liquid being measured by the approach of the housing and rod one toward the other and cooperating with one of said members to indicate measured quantities of liquid.

6. In a liquid gauge of the character described, a unitary structure including an elongated channel shaped housing member, a closure for the open side of the housing member yieldingly connected thereto for relative shifting motion, a spring against the yielding resistance of which the channel and closure are relatively movable toward and from each other, a float loosely confined within the channel housing member by said closure when the channel and closure are moved from each other and clamped therebetween in its adjusted position by their approach, and a separate gauge rod to be connected with such unitary structure having thereon a series of graduations with which the float cooperates to indicate measured quantities of liquid.

7. In a liquid gauge, a channel member, an angle bar disposed across the open face of the channel member, sliding connections whereon the channel and angle bar are movable diagonally one relative to the other, a float confined within the channel member by said angle bar, and a gauge stick secured within the angle of said angle bar with which the float cooperates to indicate measured quantities of liquid.

8. In a liquid gauge of the character described, a unitary structure to be assembled apart from a gauge stick including a channel shaped housing member, a supporting bracket with which the channel shaped housing member is connected for relative movement, a float confined within the channel shaped housing member and clamped in its relative position assumed at the level of a body of liquid being measured by the movement of the channel shaped housing member, a spring actuating the housing member into clamping engagement with the float, said unitary structure being adapted to be mounted upon a gauge stick having thereon a series of graduations with which the float cooperates to indicate measured quantities of liquid.

9. In a liquid gauge of the character described, a gauge rod, an elongated housing yieldingly connected with the rod, the housing and rod being laterally adjustable one relative to the other incidental to relative longitudinal movement thereof, a spring against the yielding resistance of which the rod and housing are relatively movable, a float enclosed within the housing and clamped in its position of adjustment by the relative approach of the rod and housing, and an indicator controlled by the fluctuations of the float to indicate the quantity of body of liquid being measured.

10. In a liquid gauge of the character described, a gauge rod, a channel member carried thereby in laterally offset parallel relation, a closure for the open side of the panel member yielding connections between the channel member and the closure, a spring against the resistance of which the rod and channel member are movable one relative to the other, a float enclosed within the channel member and clamped in its position assumed at the level of a body of liquid being measured by the relative approach of the channel and closure to indicate a measured quantity of liquid.

11. As an article of manufacture, a liquid gauge unit to be assembled apart from a gauge rod, including a float and a pair of relatively adjustable clamp members engageable therewith to hold the float in its assumed position at the level of a body of liquid being measured, and resilient means urging the clamp members into engagement with the float, said assembly being interchangeably engageable as a unit with any one of several gauge rods with which the float may cooperate to indicate a measured quantity of liquid.

12. As an article of manufacture, a liquid gauge unit including a float, a pair of clamp members between which the float is positioned interconnected for relative diagonal movement into and out of clamping engagement with the float, and a spring urging said members into engaging relation with the float, one of said members being interchangeably attachable to any one of several gauge rods with which the float may cooperate to indicate a measured quantity of liquid.

13. In a liquid gauge of the character described, a gauge unit interchangeable engageable after assembly with any one of several gauge rods, including two relatively adjustable members yieldingly connected one with the other for combined longitudinal and lateral motion of one relative to the other, a float interposed therebetween and clamped in its position assumed at the level of a body of liquid being measured by the approach of one of said relatively adjustable members toward the other, a spring against the yielding resistance of which the members are movable out of clamping relation with the float, and a seat on one of said members for detachable engagement with a gauge rod with which the float cooperates to indicate a measured quantity of liquid.

14. In a gauge member, a channel shaped member, a rod extending in longitudinal parallel relation therewith, cam slots in the channel shaped member, guides carried by the rod engaging in the slots, said rod being diagonally movable relative to the channel shaped member in a direction determined by said slots, a float enclosed within the channel shaped member and clamped therein by the relative movement of the rod and a spring tending to move the rod into clamping engagement with the float.

OLIVER WATSON.